United States Patent
Unemyr et al.

(10) Patent No.: US 9,916,488 B2
(45) Date of Patent: *Mar. 13, 2018

(54) EVALUATING IMAGES

(71) Applicant: Intermec Technologies Corporation, Fort Mill, SC (US)

(72) Inventors: Erik Karl Henning Unemyr, Singapore (SG); Karl Perry, Port Ludlow, WA (US)

(73) Assignee: Intermec Technologies Corporation, Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,347

(22) Filed: May 3, 2017

(65) Prior Publication Data
US 2017/0235991 A1 Aug. 17, 2017

Related U.S. Application Data

(63) Continuation of application No. 14/862,336, filed on Sep. 23, 2015, now Pat. No. 9,646,191.

(51) Int. Cl.
*G06K 7/14* (2006.01)
*G06K 19/06* (2006.01)

(52) U.S. Cl.
CPC ......... *G06K 7/1486* (2013.01); *G06K 7/1413* (2013.01); *G06K 7/1417* (2013.01); *G06K 19/06028* (2013.01); *G06K 19/06037* (2013.01)

(58) Field of Classification Search
USPC ................. 235/462.1, 454; 382/112, 162
See application file for complete search history.

(56) References Cited

U.S. PATENT DOCUMENTS

| 4,685,139 | A  | 8/1987  | Masuda et al.  |
| 6,832,725 | B2 | 12/2004 | Gardiner et al. |
| 7,128,266 | B2 | 10/2006 | Zhu et al.     |
| 7,159,783 | B2 | 1/2007  | Walczyk et al. |

(Continued)

FOREIGN PATENT DOCUMENTS

| EP | 3067710 A1    | 9/2016  |
| WO | 2013163789 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Allyson Trail
(74) *Attorney, Agent, or Firm* — Additon, Higgins & Pendleton, P.A.

(57) ABSTRACT

A method for evaluating an output pattern printed on a medium is described. A reference pattern is stored. The output pattern is printed on the medium correspondingly on the stored reference pattern. A scan based instance of the output pattern is rendered, which has a set of features at least corresponding to the printed output pattern and zero or more features additional thereto. A difference image, having the zero or more features of the rendered scan instance, is computed based on a comparison of the rendered scan instance to the stored reference pattern. Upon the zero or more features including at least one feature, the computed difference image is evaluated in relation to a proximity of at least one feature to locations pixels of the reference pattern.

20 Claims, 8 Drawing Sheets

(56) References Cited

U.S. PATENT DOCUMENTS

| | | |
|---|---|---|
| 7,413,127 B2 | 8/2008 | Ehrhart et al. |
| 7,474,995 B2 | 1/2009 | Masiello et al. |
| 7,726,575 B2 | 6/2010 | Wang et al. |
| 8,294,969 B2 | 10/2012 | Plesko |
| 8,314,730 B1 | 11/2012 | Musiak et al. |
| 8,317,105 B2 | 11/2012 | Kotlarsky et al. |
| 8,322,622 B2 | 12/2012 | Liu |
| 8,344,933 B1 | 1/2013 | Kronfeld et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,604,963 B1 | 12/2013 | Kronfeld et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |

(56) References Cited

U.S. PATENT DOCUMENTS

| | | |
|---|---|---|
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 9,646,191 B2 | 5/2017 | Unemyr et al. |
| 2001/0040599 A1 | 11/2001 | Dundand |
| 2004/0035932 A1 | 2/2004 | Bailleu et al. |
| 2004/0189603 A1 | 9/2004 | Arrigo et al. |
| 2005/0286742 A1 | 12/2005 | Rasmussen et al. |
| 2007/0063048 A1 | 3/2007 | Havens et al. |
| 2009/0116044 A1 | 5/2009 | Platt et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0092701 A1 | 4/2012 | Wang et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |

(56) References Cited

U.S. PATENT DOCUMENTS

| | | |
|---|---|---|
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0130717 A1 | 5/2015 | Hasu |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0266249 A1 | 9/2016 | Kauffman et al. |
| 2016/0292477 A1 | 10/2016 | Bidwell |
| 2016/0294779 A1 | 10/2016 | Yeakley et al. |
| 2016/0306769 A1 | 10/2016 | Kohtz et al. |

(56) References Cited

U.S. PATENT DOCUMENTS

2016/0314276 A1 10/2016 Sewell et al.
2016/0314294 A1 10/2016 Kubler et al.

FOREIGN PATENT DOCUMENTS

WO 2013173985 A1 11/2013
WO 2014019130 A1 2/2014
WO 2014110495 A1 7/2014

OTHER PUBLICATIONS

U.S. Appl. No. 14/277,337 for Multipurpose Optical Reader, filed May 14, 2014 (Jovanovski et 31); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 14 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch For a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
Extended European Search Report in counterpart EP Application No. 16190014.7 dated Feb. 16, 2017, pp. 1-12.
Extended European Search Report in related EP Application No. 17161312.8 dated Aug. 24, 2017, pp. 1-7.

EXAMPLE 1D 'DRAG' MODE MEDIA PRODUCT 61

EXAMPLE 1D 'PICKET FENCE' MODE MEDIA PRODUCT 62

EXAMPLE 2D MEDIA PRODUCT 63

EXAMPLE TEXT BASED MEDIA PRODUCT 64

EVALUATING IMAGES

CROSS-REFERENCE TO RELATED APPLICATION

The present application claims the benefit of U.S. patent application Ser. No. 14/862,336 for Evaluating Images filed Sep. 23, 2015 (and published Mar. 23, 2017 as U.S. Patent Publication No. 2017/0083734), now U.S. Pat. No. 9,646, 191. Each of the foregoing patent application, patent publication, and patent is hereby incorporated by reference in its entirety.

TECHNOLOGY FIELD

The present invention relates generally to printing. More particularly, example embodiments of the present invention relate to evaluating symbols printed on media.

BACKGROUND

Generally speaking, data patterns, and indicia such as bar code patterns, data matrix patterns, Optical Character Recognition (OCR) fonts, text characters, graphic images, logos and other one dimensional (1D) and two dimensional (2D) patterns of geometric and graphic data (referred to herein as "patterns") are useful in a wide variety of applications. Some printers and printing evaluating processes may be specialized for efficient printing of the data patterns on labels or other graphic media. For example, bar code printers may thus be widely deployed in various supply chain and identification applications.

Some bar codes, data patterns and other symbols comprise information of significant relevance, importance, or substance in relation to an operation, endeavor, or enterprise ("operation"). Some of the significant information may be mission-critical to an operation. The success of the operation may depend, at least in part, on the mission-critical information. Accurate presentation, transactional reliability, and security thus become significant factors in relation to mission-critical information. Such data may also have a high time value, low duration of fresh relevance, and related heightened levels of urgency, which may make timely handling or responsiveness appropriate based on the accurate presentation.

In view of their significance, quality related verification is a significant feature of various printing evaluating processes and printing evaluating systems are thus associated with the production of mission-critical printed media. The printed data are verified using scanning and validation processes to compare an output instance of an image with a stored digital reference or programmed original instance of the image. An acceptable correlation may be determined based on the comparison. For example, alphanumeric, pictographic, or character based, and other text related data may be verified using an OCR process in relation to clarity, legibility, readability, and correct conformance to the reference or original.

Barcodes and other data patterns may be verified based on a scanning process. For example, a brief, simple scan may be performed to verify that a barcode pattern, QR code pattern or the like is actually scannable, and may thus be read, decoded, and stored. Additionally or alternatively, the data patterns may be subject to scanning to ascertain their compliance with a programmed quality specification, and/or to quality standards promulgated by the American National Standards Institute (ANSI), International Electrotechnical Commission (IEC) International Organization for Standardization (ISO), and other authorities.

For example, 1D Universal Product Code (UPC) and 2D matrix data patterns may be specified to comply with quality specifications set forth in the 'ANSI/UCC5' standard. Linear (1D) barcode patterns may be specified to comply with quality specifications set forth in the 'ISO/IEC 12516' standard. Quick Response (QR), Han Xin, and other 2D data patterns may be specified to comply with quality specifications set forth in the 'ISO/IEC 15415' standard.

These verification techniques however may be associated with nontrivial costs in relation to operator time, attention, and diversion from more productive and/or profitable activity. Moreover, access to reference instances corresponding to printed output products reflective of intended, original, programmed, stored, modeled, and/or otherwise "correct" printed product outcomes, may be lacking, unavailable, stale or corrupt.

Separate technologies and independent applications may be used to fully verify the correctness of the data. These however may tend to add complexity, cost, and the possibility of introducing inaccuracy. An OCR algorithm may be used in an effort to compute an estimate or essentially "guess" at the correctness of a printout without reference to actual input or other reference data on which the printout is ostensibly based.

For example, the 'Arabic' numeral '4' may be modeled for printing a corresponding feature with an open upper portion. However, OCR may read a '4' character as "correct," which has the upper portion closed by the vertex of an acute angle. The OCR may thus fail to ascertain actual compliance of an output print product to a reference input.

To mitigate the effects of latency and costs associated with visual examination of print products, inspections may be limited to "spot checks." However, such spot checks are typically performed only over portions of an entire print product. The print product portions are typically significantly smaller than the entire print product. For example, while a print product may comprise a total of 100, 1000, or 10,000 labels a corresponding spot check performed over five percent (5%) of the total product samples only five (5), 50 or 500 of the product, respectively. These spot checks essentially thus overlook 95, 950, or 9,500 of the labels, respectively. Such visual inspections may miss some quality deficient labels and may thus be error-prone, in least over the major portions of the print products that remain unexamined. Thus, the actual correctness of any printout, in its entirety, may remain effectively indeterminate and best on a statistically inferred quality level. Imperfect individual products may escape notice.

Some contemporary applications however may rely however, at least in part, on verifying the accuracy of the printed products. For example, accuracy in the labeling of prescription drugs may comprise a serious quality specification for printing evaluating processes undertaken by pharmacies and other health care endeavors. Lifesaving drugs, powerful narcotics, radioactive pharmaceuticals, and therapeutic substances and solutions may be dangerous if dosed or otherwise used improperly or incorrectly provide a clear and high example of the importance of accurate labeling.

In these respects, verifying the accurate printing of correct labels for medicine may thus be considered mission-critical to pharmacies and in other health care scenarios. Verification based the typical OCR and visual examination approaches may be insufficient in such mission-critical printing applications.

Therefore, it would therefore be useful to verify printed media products of mission-critical printing processes to confirm that information presented by output images correspond accurately to original instances or input digital images, on which the printing is based. It would also be useful to verify the printed media products without necessarily implicating, or resorting to either OCR based confirmation of text related images or for printed data patterns, to grading related to standards, specifications, and/or simplistic scannability checks. Further, it would be useful to verify the printed media products automatically with a high degree of accuracy and testing throughput speed, which obviates "spot checking" of mere sampled portions of a total printing product output, yet adds no significant latency or demands on an operator attention.

SUMMARY

Accordingly, in one aspect, an example embodiment of the present invention embraces a method for evaluating printed media products of mission-critical printing processes to verify or confirm that information presented by output images correspond accurately to original instances and/or input digital 'reference' images, on which the printing is based. Example embodiments of the present invention are operable for verifying the printed media products without implicating, or resorting to OCR based confirmation of text related images or for printed data patterns, to grading related to standards, specifications, yet exceeding the confirmation of simply checking scannability of the media products. Further, example embodiments are operable for verifying the printed media products automatically with a high degree of accuracy and testing throughput speed, which obviate spot checking sampled portions of a total printing product output, yet add no significant latency or demand on an operator's attention and focus.

An example embodiment of the present invention relates to a method for evaluating an output pattern printed on a medium. A reference pattern is stored. The output pattern is printed on the medium based correspondingly on the stored reference pattern. A scan based instance of the output pattern is rendered, which comprises a set of features at least corresponding to a scan of the printed output pattern, and zero or more features additional thereto. A difference image, comprising the zero or more features of the rendered scan based instance, is computed based on a comparison of the rendered scan instance to the stored reference pattern. Upon the zero or more features comprising at least one feature, the computed difference image is evaluated in relation to a proximity of the at least one feature to locations of one or more picture elements (pixels) of the reference pattern.

In an example embodiment, the computation of the difference image comprises performing an 'exclusive OR' (XOR) logical operation over the pixels of the rendered scan based instance of the output pattern, relative to each corresponding pixel of the stored reference pattern. The at least one of the zero or more features corresponds to a superfluous "defect" feature, which is printed in the output pattern apart from a desired target pattern modeled by the stored reference pattern.

Based on the evaluation step, a determination may be made in relation to the proximity. It may be determined that an unacceptably small distance separates a spatial position of one or more pixels of the at least one of the zero or more features, and a spatial position corresponding to the location of the one or more stored reference pattern pixels. The distance between the defect feature and the output pattern may be determined to be so small that graphic information, intended for representation by the output pattern, may possibly be corrupted or confused by the defect feature. Upon the determination, a warning is presented in relation to the unacceptably small separation. The warning calls attention to the defect and its position proximate to the output pattern, which allows (and/or may prompt) a review of the output pattern.

An example embodiment may be implemented in which a subsequent printing of the output pattern is adjusted based on the determination of the insufficient proximity. In the adjusted subsequent printing, the at least one of the zero or more features with the insufficient proximity is eliminated from an output pattern of the subsequent printing. The subsequent printing may be adjusted based on a user input received in response to a review of the presented warning. The subsequent printing may also or alternatively be adjusted automatically based on the determination.

Based on the evaluation, it may also (or alternatively) be determined that an acceptable distance separates a position of one or more pixels of the at least one of the zero or more features, and a position corresponding to the location of the one or more stored reference pattern pixels. The distance between the "acceptable" defect feature and the output pattern is determined to be great enough that the graphic information, intended for representation by the output pattern, is unlikely to be corrupted or confused by the defect feature. Defect features determined as sufficiently distant from the output pattern may be indicated as such, or ignored.

The stored reference pattern comprises a graphic model for the printing of the output pattern. The output pattern is thus printed based correspondingly on the stored reference pattern. An example embodiment may be implemented in which the evaluation method thus comprises the printing of the output pattern on the medium based on the stored reference pattern. Further, the rendering of the scan based instance may comprise scanning the output pattern printed on the medium. The scan based instance may thus be rendered based on the scanning of the printed output pattern.

An example embodiment of the present invention relates to a method for evaluating an image printed on an output media product. The output image comprises a pattern printed on a medium. The pattern may comprise a 1D or a 2D data pattern, symbol, text, graphics, or indicia of any kind.

The medium may comprise paper, plastic, or other commonly used print media, on which the patterns are printed with ink, dye, thermal appliqué, or other techniques. The medium may also comprise a metallic or other material, on which the patterns are marked using laser, chemical, or other etching related printing techniques, or with dyes, stains or the like.

The reference pattern may comprise an input to a printing evaluating system, which is stored as instructions on a non-transitory computer readable storage medium. The non-transitory computer-readable storage medium may comprise memory, disk, drive, and/or flash-based storage operable electromagnetically, electro-optically, or electronically. The input may be received by streaming over a network connection or loaded from an external storage medium, such as a flash drive, an optical disk, or by other modes.

In another aspect, example embodiments of the present invention embrace a printing evaluation system. An example embodiment of the present invention relates to a system for evaluating an output pattern printed on a medium. The evaluating system comprises a non-transitory computer readable storage medium operable for storing a reference pattern comprising a reference pattern. The output pattern is printed on the medium based correspondingly on the stored reference pattern.

The system also comprises a scanner, which is operable for rendering a scan based instance of the output pattern. The rendered scan based instance comprises a set of features at least corresponding to the printed output pattern, and zero or more features additional thereto.

Further, the system comprises one or more image processors. The processors are operable for computing a difference image, and for evaluating the computed difference image. The difference image is computed based on a comparison of the rendered scan instance to the stored reference pattern. The computed difference image comprises the zero or more features of the rendered scan instance.

An example embodiment may be implemented in which the computation of the difference image comprises executing an XOR logical operation over the pixels of the rendered scan based instance of the output pattern, relative to each corresponding pixel of the stored reference pattern. The computed difference image is evaluated in relation to a proximity of at least one feature to locations of one or more pixels of the reference pattern.

The evaluation of the computed difference image by the image processors may comprise determining, based on the evaluation of the computed difference image, that the proximity comprises an unacceptably small separation between a position of one or more pixels of a defect feature to the location of the one or more stored reference pattern pixels. A warning, based on the determining step, is presented in relation to the determination of the unacceptable proximity of the defect. If the proximity is determined to be acceptably large, then an acceptability of the defect may be indicated.

The evaluating system may further comprise a printer component operable for printing the output pattern on the medium based on the stored reference pattern. The stored reference pattern comprises a graphic model, based on which the printer component prints the corresponding output pattern.

The printer component may also be operable for adjusting a subsequent printing of the output pattern based on the determination that the proximity of a defect is unacceptable. The at least one of the zero or more features may thus be eliminated from an output pattern of the subsequent printing. The printer may adjust the subsequent printing in response to an operator input, or automatically.

In an example embodiment, the printing evaluating system is operable for evaluating the output image based on a printing evaluating process, such as the method summarized above.

In yet another aspect, example embodiments of the present invention embrace a non-transitory computer readable storage medium. An example embodiment relates to a non-transitory computer readable storage medium comprising instructions, which when executed by a processor are operable for causing, controlling, and/or programming a printing evaluating process relating to evaluating an output image comprising a pattern printed on a medium, such as the method summarized above.

In still yet another aspect, example embodiments of the present invention embrace media products. An example embodiment relates to a media product comprising an output image, which comprises a pattern printed on a medium by a process operable for evaluating the output image, such as the method summarized above. The media product comprises patterns, images, graphic designs, geometric shapes, symbols, alphanumeric, pictographic, character related and other text, and 1D linear and 2D matrix data patterns, labels, emblems, designs and the like ("patterns") printed on printable media substrates.

The text may comprise alphanumeric, pictographic, character based, and other patterns related to writing and script. The 1D data patterns may comprise barcode patterns such as Universal Product Code (UPC) barcodes and others. The 2D data patterns comprise matrix patterns, such as Han Xin data patterns, Quick Response (QR) data patterns and other geometrically arrayed data patterns.

The printed medium may comprise a substrate such as paper or plastic on which the symbols are marked with inks, heat-sensitive, or other marking materials. The substrate may also (or alternatively) comprise metal or other materials on which the symbols are marked by etching (e.g., laser or chemical), stains, or other means.

The foregoing illustrative summary, as well as other example features, functions and/or aspects of embodiments of the invention, and the manner in which the same are accomplished, are further explained within the following detailed description of example embodiments and each figure (FIG.) of the accompanying drawings.

DETAILED DESCRIPTION OF EXAMPLE EMBODIMENTS

Figure 1:
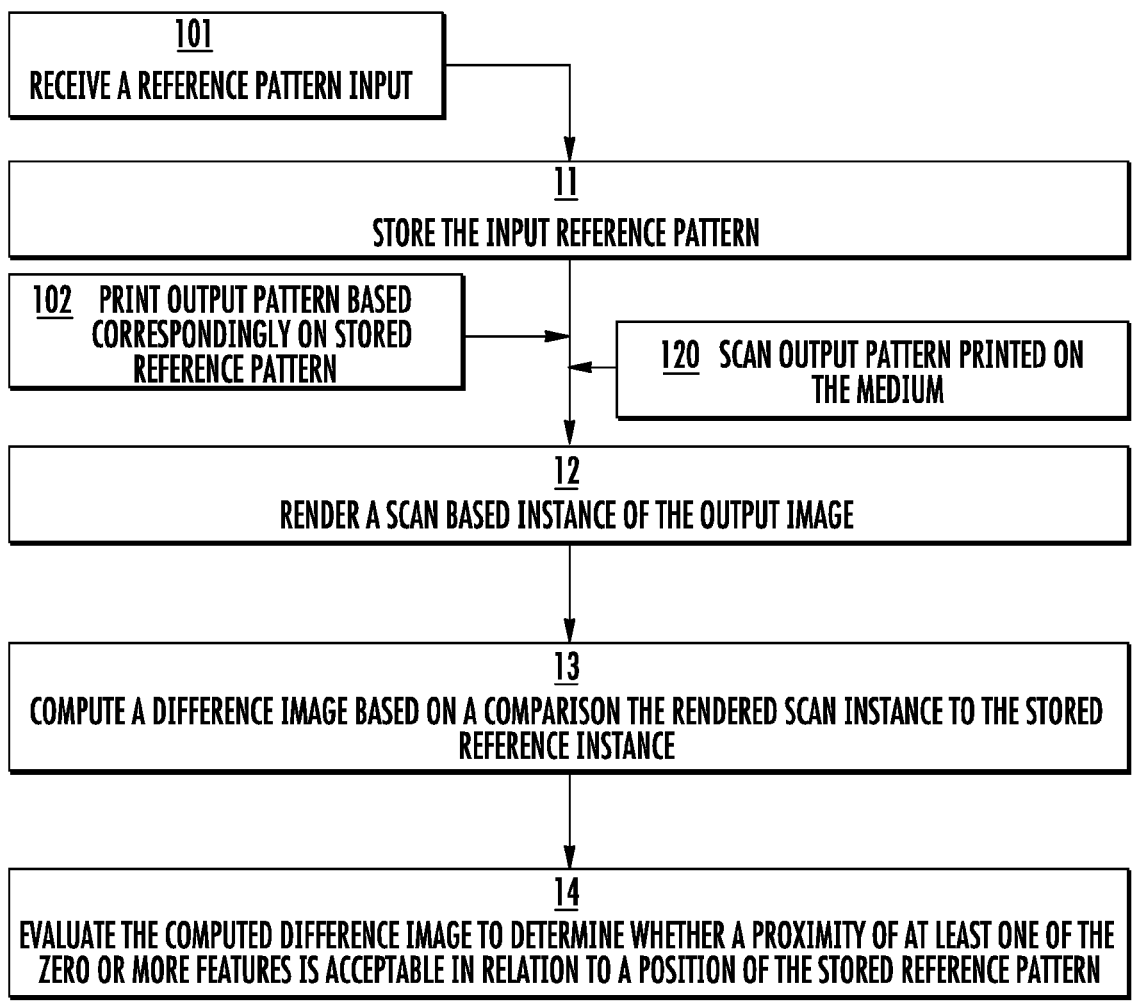
FIG. 1 depicts a flowchart of an example printing evaluating process, according to an embodiment of the present invention.

Example embodiments of the present invention are described in relation to a method and system for evaluating an output pattern printed on a medium. A reference pattern is stored. The output pattern is printed on the medium based correspondingly on the stored reference pattern. A scan based instance of the output pattern is rendered, which comprises a set of features at least corresponding to the printed output pattern and zero or more features additional thereto. A difference image, having the zero or more features of the rendered scan instance, is computed based on a comparison of the rendered scan instance to the stored reference pattern. Upon the zero or more features comprising at least one feature, the computed difference image is evaluated in relation to a proximity of at least one feature to locations pixels of the reference pattern.

Example embodiments of the present invention thus evaluate printed media products of mission-critical printing processes to verify or confirm that information presented by output images correspond accurately to original instances and/or input digital reference patterns, on which the printing is based. Example embodiments of the present invention thus verify the printed media products without implicating, or resorting to OCR based confirmation of text related images or for printed data patterns, to grading related to standards, specifications, yet exceeding the confirmation of simply checking scannability of the media products. Further, example embodiments verify the printed media products automatically with a high degree of accuracy and testing throughput speed, which obviate spot checking sampled portions of a total printing product output, yet add no significant latency or demand on an operator's attention and focus.

Overview.

An example embodiment of the present invention relates to a method for evaluating an output pattern printed on a medium. A reference pattern is stored. The output pattern is printed on the medium based correspondingly on the stored reference pattern. A scan instance of the output pattern is rendered, which comprises a set of features at least corresponding to the printed output pattern and zero or more features additional thereto. A difference image, comprising the zero or more features of the rendered scan instance, is computed based on a comparison of the rendered scan instance to the stored reference pattern. Upon the zero or more features comprising at least one feature, the computed difference image is evaluated in relation to a proximity of at least one feature to locations of one or more pixels of the reference pattern.

In an example embodiment, the computation of the difference image comprises performing an 'exclusive OR' (XOR) logical operation over the pixels of the rendered scan based instance of the output pattern, relative to each corresponding pixel of the stored reference pattern. The at least one of the zero or more features may correspond to a superfluous "defect" feature printed in the output pattern apart from a desired target pattern modeled by the stored reference pattern.

Based on the evaluation step, a determination may be made in relation to the proximity. It may be determined that an unacceptably small distance separates a spatial position of one or more pixels of the at least one of the zero or more features, and a spatial position corresponding to the location of the one or more stored reference pattern pixels. The distance between the defect feature and the output pattern may be determined to be so small that graphic information, intended for representation by the output pattern, may possibly be corrupted or confused by the defect feature. Upon the determination, a warning is presented in relation to the unacceptably small separation. The warning calls attention to the defect and its position proximate to the output pattern, which allows or may prompt a review of the output pattern.

An example embodiment may be implemented in which a subsequent printing of the output pattern is adjusted. In the adjusted subsequent printing, the at least one of the zero or more features is eliminated from an output pattern of the subsequent printing. The subsequent printing may be adjusted based on a user input received in response to a review of the presented warning. The subsequent printing may also or alternatively be adjusted automatically based on the determination.

Based on the evaluation, it may be determined that an acceptable distance separates a position of one or more pixels of the at least one of the zero or more features, and a position corresponding to the location of the one or more stored reference pattern pixels. The distance between the "acceptable" defect feature and the output pattern is determined to be sufficient that the graphic information, intended for representation by the output pattern, is unlikely to be corrupted or confused by the acceptable defect feature. Upon the determination that a defect feature is sufficiently distant from the output pattern, an indication may be presented in relation to its acceptability, or acceptable defects may be ignored.

The stored reference pattern comprises a graphic model. The output pattern may be printed, and may thus correspond to the stored reference pattern based on the graphic model. An example embodiment may be implemented in which the evaluation method thus comprises the printing of the output pattern on the medium based on the stored reference pattern. Further, the rendering of the scan based instance may comprise scanning the output pattern printed on the medium. The scan based instance may thus be rendered based on the scanning of the output pattern.

Example embodiments of the present invention relate to a non-transitory computer readable storage medium comprising instructions operable for causing, controlling, or programming one or more processors for performing the method above.

Example embodiments of the present invention relate to an evaluation system operable in relation to performance of the method described below, and to printed media products evaluated by therewith.

Example Printing Evaluation Process.

An example embodiment of the present invention relates to a method for evaluating an image printed on an output media product. FIG. 1 depicts a flowchart of an example printing evaluating process 10, according to an embodiment of the present invention. The output image comprises a pattern printed on a medium. The pattern may comprise a 1D or a 2D data pattern, text, graphics, or indicia (patterns) of any kind.

The medium may comprise paper, plastic, or other commonly used print media, on which the patterns are printed with ink, dye, thermal appliqué, or other techniques. The medium may also comprise a metallic or other material, on which the patterns are marked using laser, chemical, or other etching related printing techniques.

The evaluating method 10 comprises process steps related to printing an output media product. At block 101, a reference pattern input is received.

In step 11 of the evaluation process, the input reference pattern is stored. The stored reference pattern comprises a set of reference features. The reference features comprise an instance of the printed pattern.

At block 102, the output media product is printed. The output media product comprises an output pattern, which is printed onto a blank substrate medium. The output pattern corresponds graphically to the stored reference pattern. The stored reference pattern is operable as a graphic model based on which the output pattern is printed and to which, the output pattern corresponds.

For example, the reference pattern may comprise an input to a printing evaluating system. The reference pattern input is stored as instructions on a non-transitory computer readable storage medium. The non-transitory computer-readable storage medium may comprise memory, disk, drive, and/or flash-based storage operable electromagnetically, electro-optically, or electronically. The reference pattern input may also (or alternatively) be received by streaming over a network connection or loaded from an external storage medium or device, such as a flash drive, an optical disk, or by other modes.

At block 120, the output media product, comprising the printed output image pattern is scanned. The scan may be performed over the output media product in real time, near real time, without intentional delay, or soon after a completion of its production or its output.

In step 12 of the evaluation process, a scan based instance image of the output pattern is rendered based on the scan. The rendered scan instance comprises at least a set of scan features at least corresponding to the set of reference features. An example embodiment may be implemented in which the scope of validation is thus limited to one or more defined regions of the printed output.

The rendered scan instance may (or may not) comprise superfluous defect features. The defect features comprise features that appear in the printed media product, but which are not present in the stored reference pattern. The rendered scan instance thus comprises zero or more features in addition to the set of reference features.

In step 13 of the evaluation process, a difference image is computed. The computed difference image comprises the zero or more features of the rendered scan instance based on a comparison the rendered scan instance to the stored reference instance.

If the rendered scan instance is free of defects, then the computed difference image may be empty, blank, or void. The number of features in a defect free rendered scan instance is thus equal to zero.

However, the rendered scan instance (and the zero or more features) may comprise at least one defect feature that appears in the printed media product, but which are not present in the stored reference pattern. In this case, the computed difference image comprises a number of elements corresponding to the at least one defect feature.

An example embodiment may be implemented in which the difference image is computed according to an XOR logical operation. The XOR operation is computed in relation to a plurality of pixels of the rendered scan instance of the output image, relative to each corresponding pixel of the stored reference pattern.

In step 14 of the evaluation process, the computed difference image is then evaluated. The evaluation of the difference image determines whether a proximity of the at least one defect feature is acceptable in relation to a position of the stored reference pattern.

Example Process Steps for Evaluating Difference Images.

Figure 2:
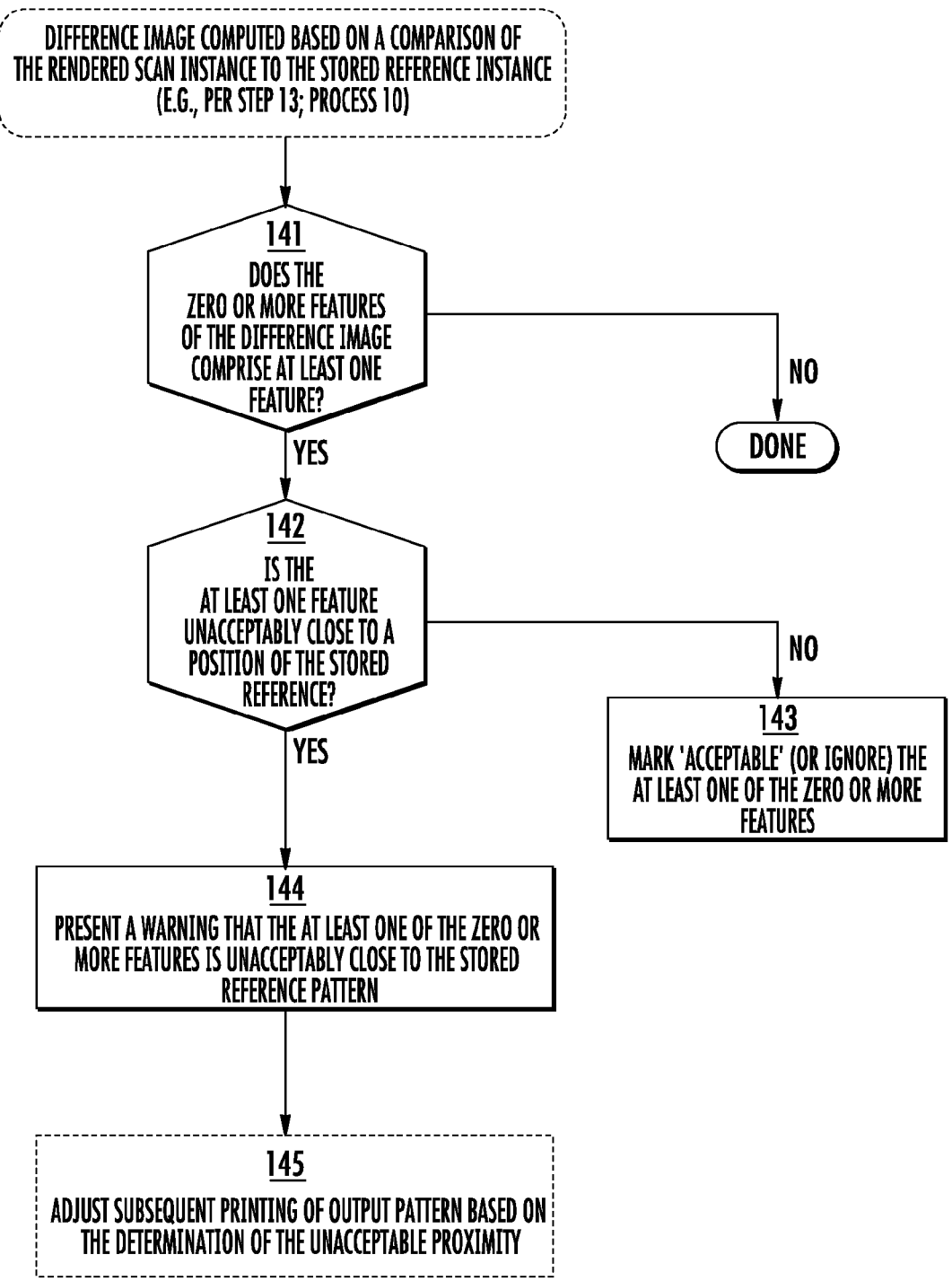
FIG. 2 depicts a flowchart for an example process for evaluating a computed difference image, according to an embodiment of the present invention.

An example embodiment may be implemented in which the evaluation of the difference image of step 14 comprises one or more decision related process steps. FIG. 2 depicts a flowchart for an example process 140 for evaluating a computed difference image, according to an embodiment of the present invention. The process 140 may correspond to performance of the step 14 of the example process 10. The process 140 may commence upon the computation of a difference image based on a comparison of the rendered scan instance to the stored reference pattern at step 13 of process 10 (FIG. 1).

In step 141, a determination is made as to whether the zero or more features of the computed difference image comprise at least one feature. If not, then no feature of the scan image instance (scanned from the features of the output pattern) does not correspond to a stored reference feature. In this case, the output pattern printed on the media product may be considered defect free, and the process 140 may be complete.

If it is determined, however, that the zero or more features of the computed difference image comprises at least one defect feature, then a determination is made in relation to a proximity of the at least one defect to a position of a corresponding to a reference feature. In step 142, a determination is made as to whether the at least one defect feature has an unacceptably close proximity to the position of the reference feature.

If not, then the proximity of the at least one defect feature comprises a sufficient distance from the position of the reference feature and in step 143, the at least one defect feature may thus be indicated (e.g., marked) in relation to its acceptable proximity, or ignored.

If however it is determined that the proximity of the at least one defect feature comprises an insufficiently close distance to the reference feature, then a warning is presented in step 144. The warning comprises a notification that the at least one defect feature has the determined unacceptable proximity to the position of the reference feature.

The determining that the proximity of the at least one of the zero or more features is unacceptable in relation to the position of the stored reference pattern relates to an insufficient spatial distance between the at least one of the zero or more features and a position of at least a part of the stored reference pattern.

The presented warning relates to an alert, notification, etc. that the defect features to which they correspond is so close to the reference feature and may thus occlude, obstruct, or obfuscate a portion of the corresponding feature printed on the output media product. The presented warning thus relates to a possibility that the defect may cause confusion and/or interfere with information programmed, modeled, or intended to be presented by the printed pattern.

An example embodiment may be implemented in which the evaluating method relates to a correction of some of the defects with unacceptable proximities to portions of the reference feature. In step 145, printing of a subsequent output image may optionally be adjusted based on the determination of the unacceptable proximity of the defect in relation to the position of the stored reference pattern. For example, the at least one of the zero or more features may be eliminated (or hidden) in a subsequent printing of the output pattern.

An example embodiment relates to a non-transitory computer readable storage medium comprising instructions, which when executed by a processor are operable for causing, controlling, and/or programming a process relating to evaluating an output image comprising a pattern printed on a medium, such as the processes 10 and 140, described above. In an example embodiment, the printing evaluation processes may be performed in a computerized or automated printing system and/or a system operable for evaluating a printed media product.

Example Evaluation System.

Figure 3:
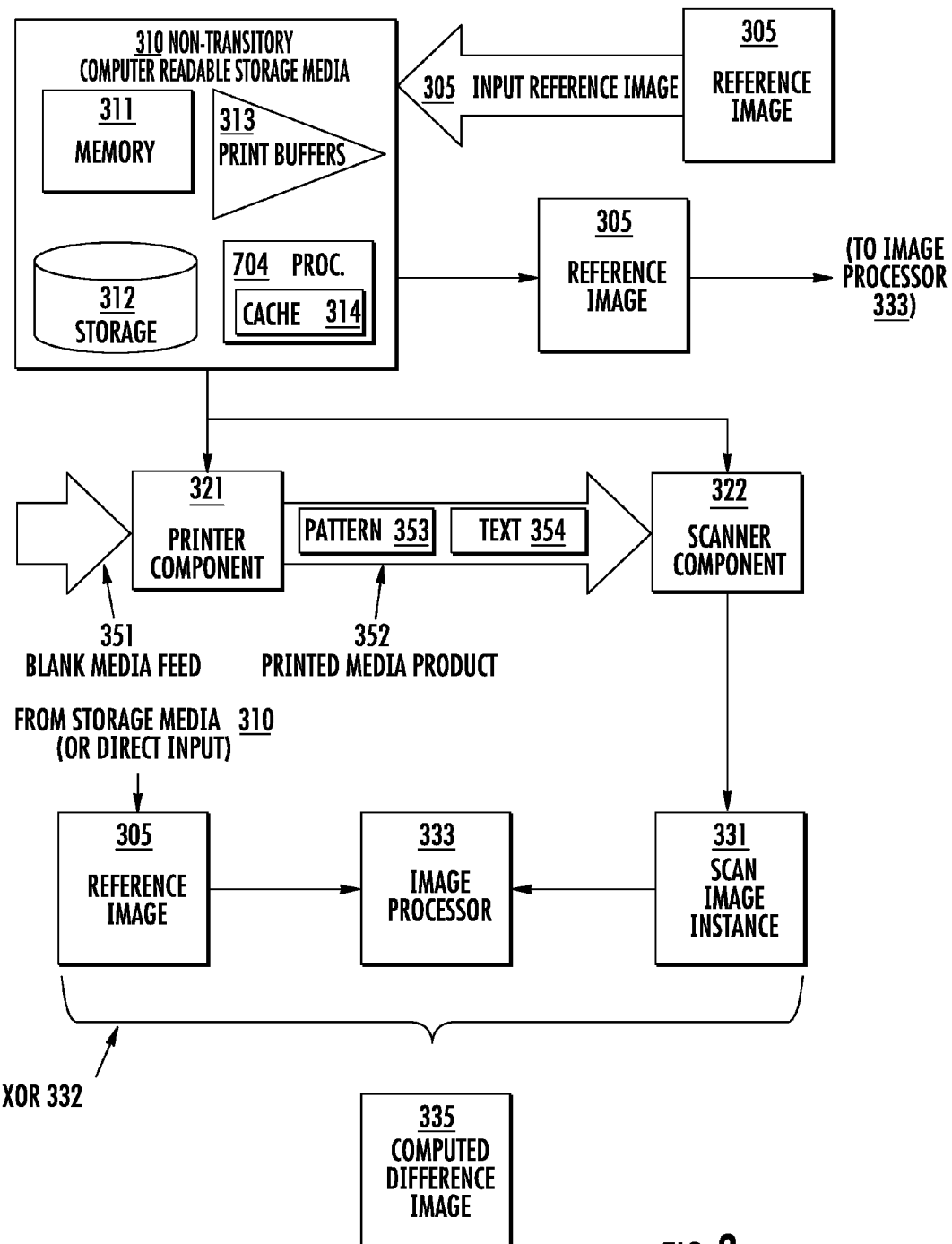
FIG. 3 depicts an example printing evaluating system, according to an embodiment of the present invention.

An embodiment of the present invention relates to a system for evaluating printed images. FIG. 3 depicts an example printing evaluating system 300, according to an embodiment of the present invention. The printing evaluating system 300 comprises a non-transitory computer readable storage medium 310 operable for storing a reference pattern.

The stored reference pattern 305 comprises a reference pattern. The reference pattern comprises a set of reference features that model a corresponding set of features based on which, the output pattern is printed. The output pattern is thus printed based correspondingly on the stored reference pattern.

The non-transitory computer readable storage media 310 may comprise a memory 311, disk, drive, or flash related storage media 312, print buffers 313, and/or one or more caches, registers, and/or latches ("caches") 314 of a microprocessor 704, an image processor 333 or other integrated circuit (IC) device. The non-transitory computer-readable storage medium may be operable electromagnetically, electro-optically, or electronically. The system 300 may receive the reference pattern 305 as an input received via streaming over a network connection or loaded from an external storage medium, such as a flash drive or an optical or magnetic disk, or by other modes.

The printing evaluating system comprises a printing component (printer) 321. The printer 321 is operable for printing 1D barcode and 2D matrix data patterns 353, text related patterns 354, and/or graphic and image related patterns onto a blank media substrate 351 with which it is fed. The patterns 353 and text 354 comprise features printed on the raw, blank media substrate 351 by the printer 321 to output the media product 352.

The raw, blank media substrate 351 may comprise paper, plastic, or other print media. The printer 321 is operable for printing, based on the stored reference pattern 305, the data patterns 353, and the text related patterns 354, etc. with a marking agent such as ink, dye, thermal appliqué, or using other techniques appropriate in relation to the media substrate 351. The blank media substrate 351 may also comprise a metallic or other material, on which the printer 321 marks the data patterns 353 and the text related patterns 354, etc. using laser, chemical, or other etching related printing techniques, and/or application of compatible marking agents such as dyes, stains, or etchants over a surface of the substrate 351, and/or penetrating the surface to any degree (e.g., including microscopically).

The printing evaluating system 300 comprises a scanner 322. The scanner 322 is operable for scanning the printed output media product 352 and for rendering a corresponding scan based image instance 331 of the output image 352, including the output pattern 353 and the output text pattern 354. The rendered scan based image instance 322 comprises a set of scan features based on the printed output patterns 353 and/or 354, and thus corresponding to the set of features of the stored input reference pattern 305.

The scan instance 331 comprises at least a set of scan features that at least corresponds to the set of reference features. The rendered scan instance may, or may not also comprise defect features. The defect features are printed (appear) in the printed media product, but are not present in the stored reference pattern. The rendered scan instance 331 may thus comprise zero or more features in addition to the set of reference features.

Figure 4:
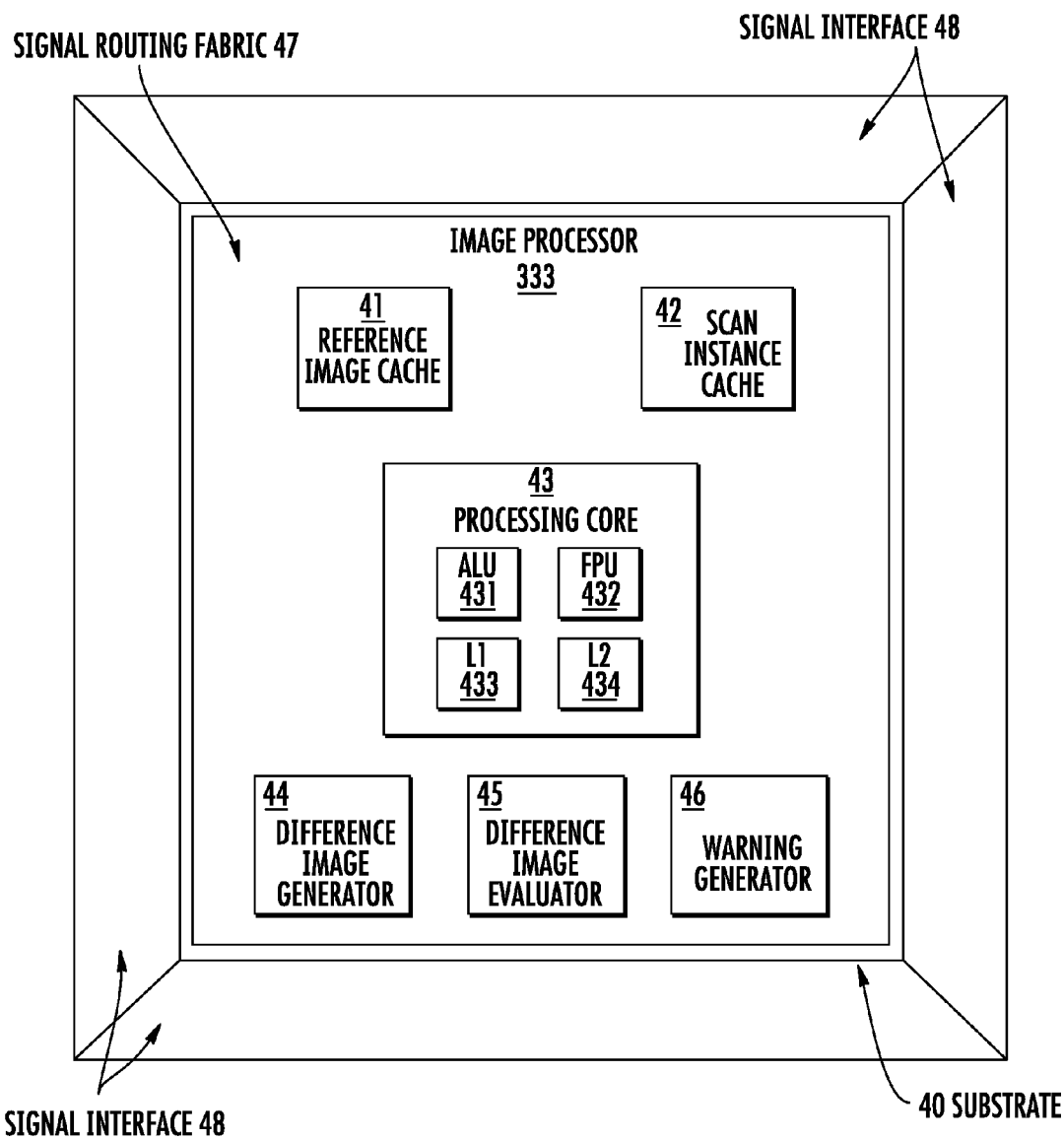
FIG. 4 depicts an example image processor, according to an embodiment of the present invention.

The evaluating system 300 comprises at least one image processor 333. The image processor 333 comprises an IC device such as a microprocessor. The image processor 333 is described with reference to FIG. 3 and FIG. 4. FIG. 4 depicts the example image processor 333, according to an embodiment of the present invention.

An example embodiment may be implemented in which the image processor 333 comprises a processing core 43. The processing core may contain an arithmetic logic unit (ALU) 431, a floating point unit (FPU) 432, and caches L1 433 and L2 434. The logic units ALU 431 and FPU 432 are respectively operable for computational functions related to image processing. The L1 cache 433 and L2 cache 434 of the core are operable for storing data related to the image processing computations.

The image processor also comprises a cache 41 operable for storing data related to the reference patterns, a cache 42 operable for storing data related to the scan instance, a difference image generator 44, a difference image evaluator 45, and a warning generator 46. Example embodiments may be implemented in which the difference image generator 44, the difference image evaluator 45, and/or the warning generator 46 are incorporated into the processing core 333 and/or share one or more operations with the processor core 43.

Components of the image processor 333 are disposed on a semiconductor substrate 40 of the IC and exchange signals with each other conductively over a signal routing fabric 47. The routing fabric 47 may comprise an array of conductive horizontal traces and vertical interconnect accesses (vias) disposed within the IC substrate. The image processor 333 also comprises a signal interface 48, with which signals are exchanged with external electronic components.

Figure 5:
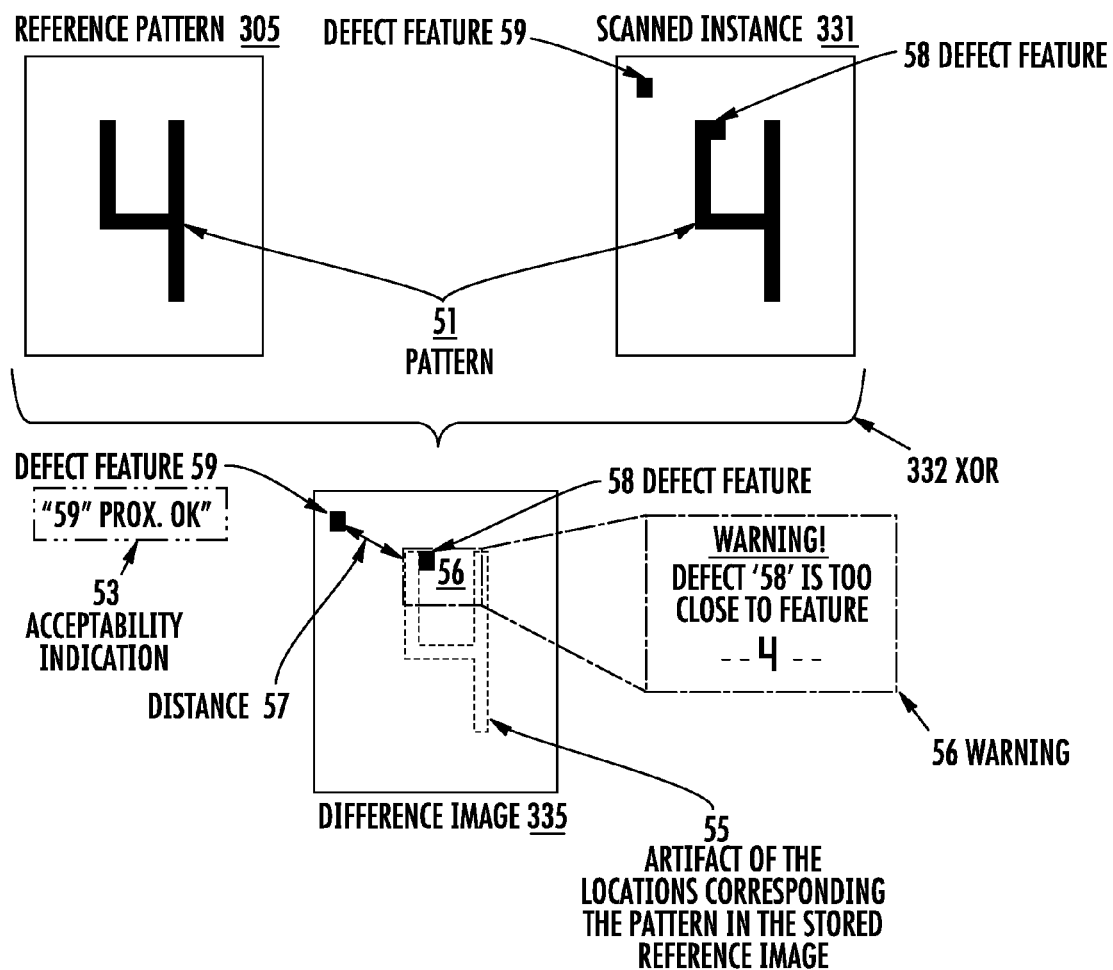
FIG. 5 depicts an example computed difference image, according to an embodiment of the present invention.

The difference image generator 44 and/or the processing core 333 are operable for comparing the rendered scan instance 331 to the stored reference pattern instance 305 and for computing a difference image 335, which comprises the zero or more features of the rendered scan instance 331. The difference image is described herein with reference to FIG. 3, FIG. 4, and FIG. 5, inclusive. FIG. 5 depicts an example computed difference image 305, according to an embodiment of the present invention. The difference image 335 is computed based on a comparison the rendered scan instance 331 to the stored reference pattern instance 305.

The scanned image instance 331 may comprise at least one of the zero or more features. The at least one feature comprises a defect feature, which may be associated with an unintended, superfluous pixel artifact of the printing process, or another source of apparent imperfection relative to the stored reference pattern instance 305.

In printing the media product 353 based on the stored reference pattern 305, the printer 321 has marked an output pattern representing an Arabic style numeral '4' on the surface of the media substrate 351 (in open-topped font or style), based on a corresponding numeral pattern feature '4' of the stored reference pattern 305. A scan of the printed media product 352 by the scanner 322 generates the corresponding scan image instance 331.

An example embodiment may be implemented in which the difference image generator 44 and/or the processing core 333 compute an XOR logical operation 332 in relation to a plurality of pixels of the rendered scan instance 331 of the output image, relative to each corresponding pixel of the stored reference pattern 305. Based on the XOR operation 332, the difference image 50 computed in FIG. 5 shows a first defect feature 58 and a second defect feature 59, each present in the scanned image 331 and absent from the reference pattern 305. An artifact map 55 may be maintained in relation to the pixel locations of the difference image 335 that correspond with pixel locations of the reference pattern. In particular for example, the pixel locations for mapping the pattern '4' between the reference pattern image 305 and the scan image 331 may be stored.

The difference image evaluator 45 and/or the processing core 333 are operable for evaluating the computed difference image 335. The evaluation of the difference image 335 determines whether a proximity of at least one of the zero or more features is acceptable in relation to a position of the stored reference pattern. With reference again to FIG. 5, for example, the defect feature 59 may be evaluated as sufficiently distant from pixels corresponding to the pattern '4', and may thus be indicated as acceptable or ignored.

The defect feature 58 however may be evaluated as too close to the mapped location of the reference pattern '4'. The proximity of the defect may thus be evaluated as unacceptable in relation to the position of the stored reference pattern '4'. For example, an acceptability indicator 53 may be presented.

Based on the determination of unacceptable proximity, the warning generator 46 and/or the processing core 333 generate or present a warning 56 that the defect 58 is too close to a portion of the reference pattern. The warning 56 comprises a notification that the defect 58 is disposed in an unacceptable proximity to the stored reference pattern '4' based on the evaluation of the computed difference image 335.

In an example embodiment, subsequent printing operations and/or the printer 321 may be adjusted to correct the defect in subsequent output media products. The defect 59 (and other defects determined to be sufficiently distant from the reference pattern) may be indicated to be acceptable, or ignored.

Example Media Products.

An example embodiment of the present invention relates to media product. The media product comprises a symbol, such as alphanumeric, pictographic, and other text, 1D bar code patterns, and/or 2D data matrix patterns. The media product is printed on a medium and evaluated by processes, such as the example evaluation related processes 10 and 140, and system 300, as described above with reference to FIG. 1, FIG. 2, and FIG. 3, respectively.

Figure 6A:
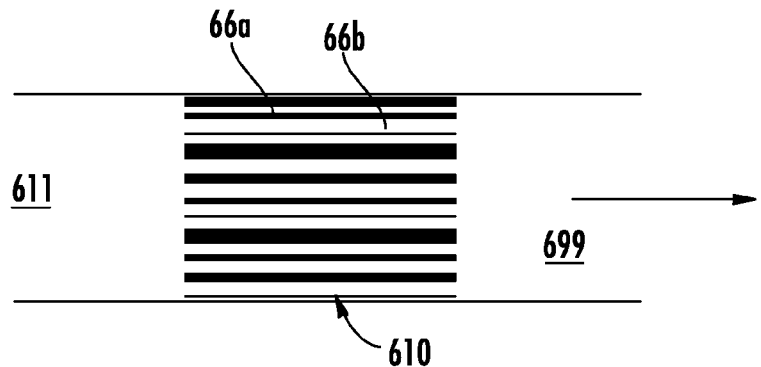
FIG. 6A depicts an example 1D bar code pattern, according to an embodiment of the present invention.

FIG. 6A depicts an example 1D bar code pattern 610, according to an embodiment of the present invention. The 1D bar code symbol 610 is depicted as though printed in a 'ladder' or 'drag' mode on the print medium 611.

Figure 6B:
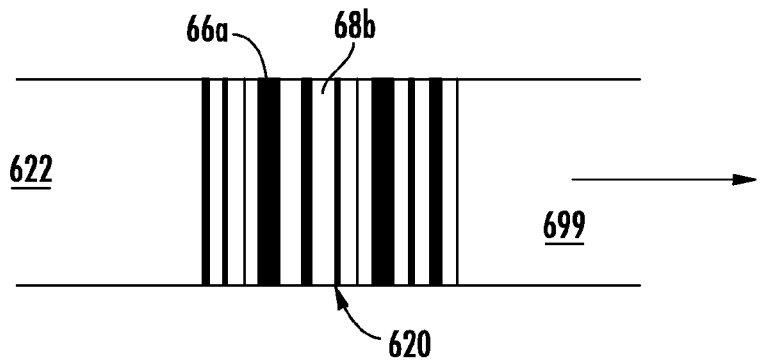
FIG. 6B depicts another example 1D bar code pattern, according to an embodiment of the present invention.

FIG. 6B depicts another example 1D bar code pattern 620, according to an embodiment of the present invention. The 1D bar code symbol 622 is depicted as though printed in a 'picket fence' mode on a print medium 622.

The bar code symbols 610 and 620 each comprise a plurality of bar elements 66a and a plurality of space elements 68b. The space elements 68b are disposed in parallel with the bar elements 66a. In the drag mode, the bar code symbol 610 is printed parallel to the direction of printing 699. In the picket fence mode, the bar code symbol 620 is printed in a perpendicular orientation to the direction of printing 699.

The bar code symbols 610 and 620 may each comprise data patterns related to, for example, an International (or "European") Article Number and/or Universal Product Code (EAN/UPC symbology) pattern, PDF417 (ISO/EC-15438 related) pattern, which comprise four of the vertical bar like symbols 66a disposed over 17 of the horizontally disposed spacer symbols 68b), 1D dot code pattern, or other 1D symbols.

Figure 6C:
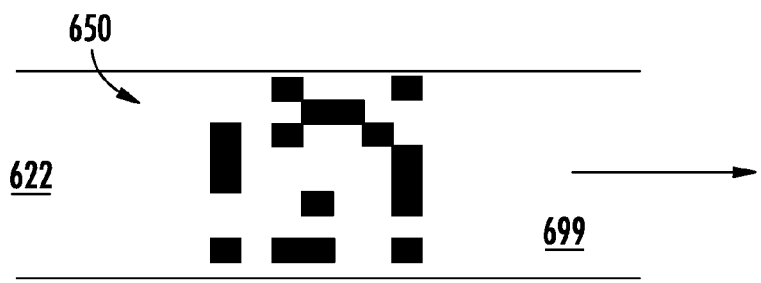
FIG. 6C depicts an example 2D matrix code pattern, according to an embodiment of the present invention.

FIG. 6C depicts an example 2D matrix code pattern 650, according to an embodiment of the present invention. The 2D matrix code pattern 650 comprises a matrix of 2D graphic symbol parts, such as squares and other rectangle and polygons, printed on a print medium 655. The matrix data pattern 650 may comprise a 2D data pattern related to, for example, quick-response (QR) and/or Han Xin graphical or geometric data matrices, or other 2D symbols.

Figure 6D:
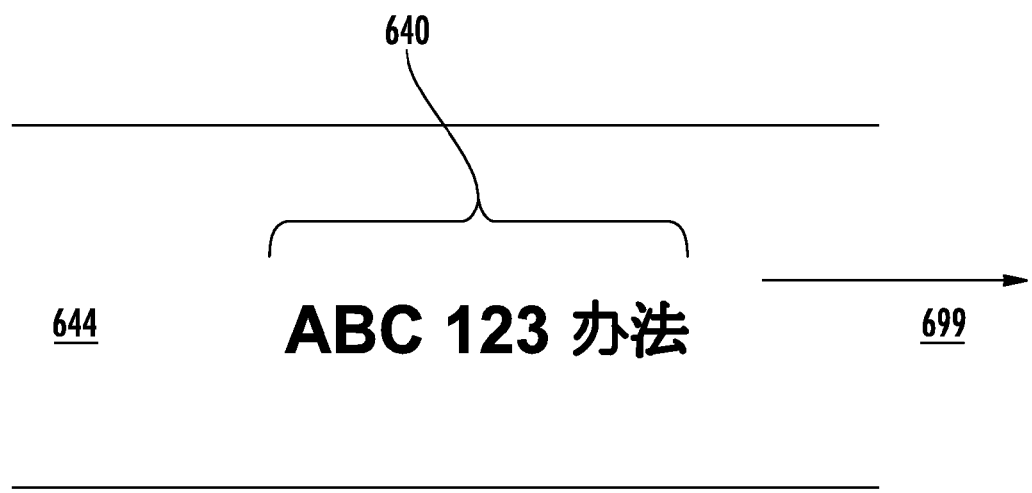
FIG. 6D depicts an example text based code pattern, according to an embodiment of the present invention.

FIG. 6D depicts an example text based code pattern 640, according to an embodiment of the present invention. The text based code pattern 640 comprises alphanumeric, pictographic (e.g., character related) or other text based graphic symbol parts (e.g., OCR patterns), printed on a print medium 644. The code pattern 640 may comprise human readable and OCR readable symbol parts, such as numbers, letters, and characters printed on a print medium 644. The data pattern 640 may comprise a 2D data pattern related to, for example, OCR-B or OCR-A, or other 2D symbols.

The print media 611, 622, 644, and 655 each move longitudinally in a direction 699 of respective printing operations. The print media 611, 622, 644, and 655 may each comprise paper for receiving ink based markings, thermally sensitive paper, or plastic or other material. The print media 611, 622, 644, and 655 may be disposed in a web configuration, which is significantly longer than it is wide. The direction of printing 699 is parallel to a longitudinal axis of the print media 611, 622, 644, and 655, along which the media move.

The symbols 610, 620, 640, and 650 may be printed on the respective web media 611, 622, 644, and 655 according to the example process 10 (FIG. 1) and the process 140 (FIG. 2), described above. An example embodiment may be implemented in which print logic generates a print command based on the reference pattern 305. The print command and related reference pattern 305 is used by a print driver to activate and energize print elements of a printer (e.g., printer 321; FIG. 3).

Responsive to the print command, for example, the activated and energized printer 321 marks a part of the bar codes 610 and 620, matrix code 650 and/or text pattern 640 based on the reference pattern 305 and the media 611, 622, 644, and/or 655, respectively, advance in the direction 699. Each time that the media is advanced, a print driver activates elements of the printer 321 for marking of subsequent bar elements 66a, and spacing of parallel space elements 66b, onto a segment (e.g., portion) onto the media 611, 622, and 655, and/or the text pattern portions onto the medium 644.

With reference again to FIG. 3, as the printed portions of the media 611, 622, 644 and 655 advance through the printer, the printed media product 352 emerges. The scanner 322 images the printed pattern and text elements 353 and 354, and stores a digitized image of the printed element as the scan image instance 331 into a scan memory area. With 'linear' operable image heads, successive scan images of the printed element may be buffered sequentially into the scan memory area in a correspondence with the succession. The print command may be stored in a command related memory area.

With reference again to FIG. 4 and FIG. 5, the image processor 333 compares the digitized scan image 331 stored in the scan memory area with the print command stored in the command memory area. The digitized image of the symbols portion and the print command are compared bit by bit (bitwise) and/or based on one or more other schemes, algorithms, or defined standards. In an example embodiment of the present invention, the comparison is based on computing the difference image 335.

The difference image 335 is evaluated in relation to defect features 59 and 58. Based on the evaluation, the warning 56 is generated in relation to the defect 58 having an unacceptable proximity to the reference pattern '4'. Based on an evaluation as acceptably distant from the reference pattern, the defect 59 may be marked as acceptable with an indication 53, or ignored.

A print quality report may be generated based on the evaluation. The print quality report may indicate whether or not the printed image complies with a defined specification, stored in relation to evaluating the symbol and portions thereof. The print quality report may indicate the manner in which the printed image differs from the desired image, and the steps taken by the printer to correct the deviation.

Statistic related to acceptable and unacceptable defects, and a total number of defects appearing, may also be included in the quality report.

The bar elements of the machine readable data code symbol parts may comprise an array of closely proximate dots or other pixel components. As the media 611, 622, 644, and 655 advance past the printer 321, the scanner 322 may digitize the pixels or other elements or features of the patterns presented in the symbols 610, 620, 640, and/or 650. Successive portions of the elements may be imaged and stored in a memory area for comparison with the reference pattern 305, associated with the print command.

With the drag mode or the picket fence mode of printing, the digitized portion of the printed image comprises a portion of a plurality of the symbolic characters 66a and 68b. Scanning and/or concomitant sampling may be performed over a portion of the bar code characters 66a and 68b and compared with the print command. The print logic, as well as the print command and the print driver, may update before printing is complete over the entire bar code symbol 610.

Example Computer Network.

Figure 7:
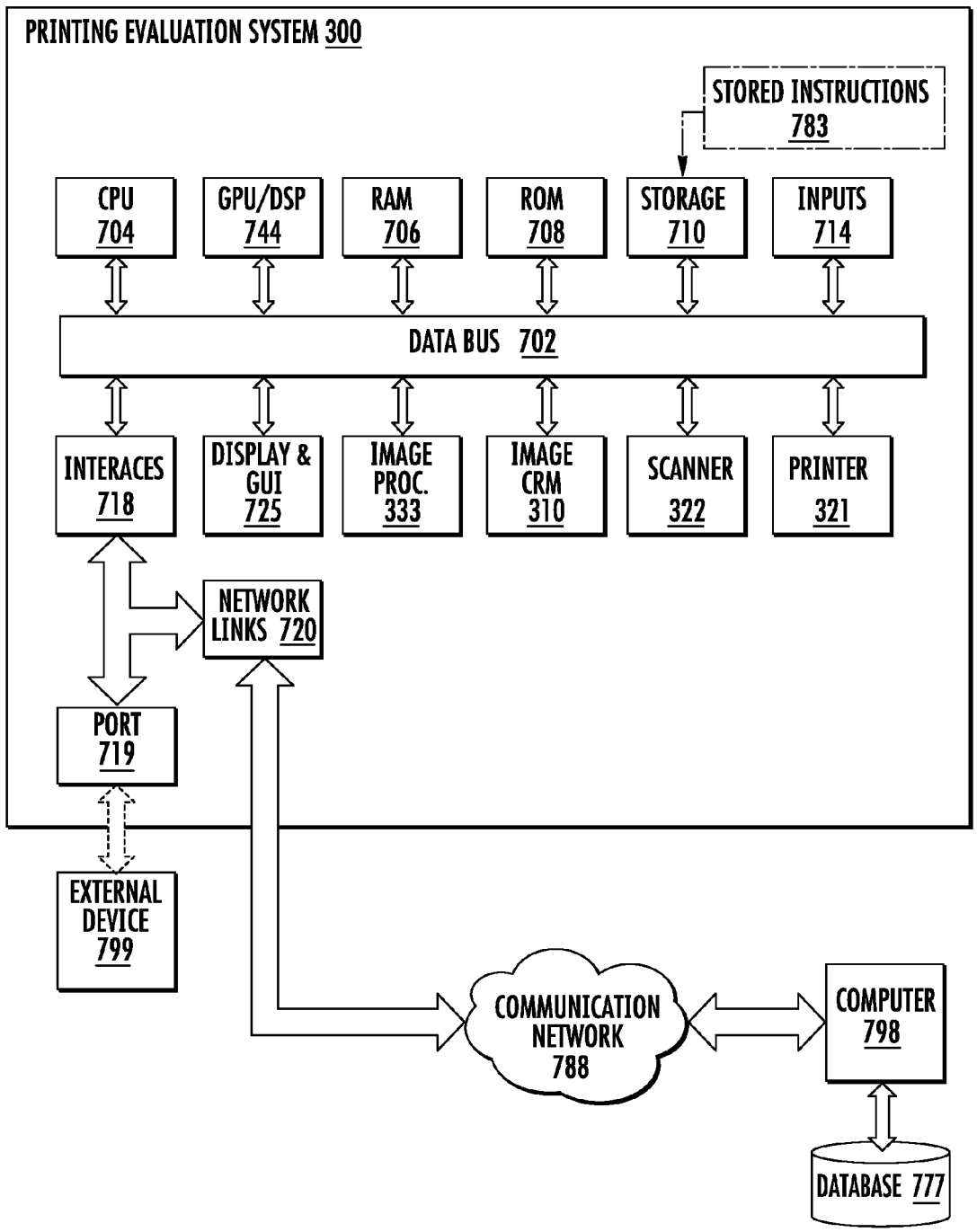
FIG. 7 depicts an example computer network, according to an embodiment of the present invention.

FIG. 7 depicts an example computer network 700, according to an embodiment of the present invention. The computer network 700 comprises a data network 788. A first computer and at least a second computer system 798 are communicatively coupled to the data network 788. The first computer comprises the printing evaluation system 300 (FIG. 3) and is operable for performing the printing evaluation process 10 (FIG. 1) and 140 (FIG. 2).

The printing evaluation system 300 is configured operably (e.g., by software code with which it is programmed). The printing evaluation system 300 is operable for communicating with other devices, such as the at least one computer 798. The printing evaluation system 300 is coupled communicatively via the network 788 with the computer 798. The network 788 may comprise a packet-switched data network operable based on transfer control and internetworking protocols (e.g., TCP/IP).

The data network 788 may comprise a portion of one or more other networks and/or two or more sub-network ("subnet") components. For example, the data network 788 may comprise a portion of the internet and/or a particular wide area network (WAN). The network 788 may also comprise one or more WAN and/or local area network (LAN) subnet components. Portions of the data network 788 may be operable wirelessly and/or with wireline related means. The data network 788 may also comprise, at least in part, a digital telephone network.

In relation to the printing evaluation system 300, the computer 798 may also be operable as a server and/or for performing one or more functions relating to control or centralized pooling, processing or storage of information gathered or accessed therewith, e.g., with a database 777.

For example, embodiments of the present invention may be implemented in which the printing evaluation system 300 is operable for sending reports 745 relating to data corresponding to the evaluation of the captured images to the computer 798 over the network 788. The computer 798 may then store the image evaluation related data in the database 777, from which it may be retrieved at a later time. The data retrieved from the database 777 may be used in evaluating and/or printing other (e.g., subsequent) images.

The printing evaluation system 300 may then send the image evaluation report 745, data relating thereto, and/or the scan related data to the computer 798 over the network 788 wirelessly, via the network 788, to the computer 798.

Upon receipt thereof, the computer 798 may be operable for processing the data related to the image evaluations and the scan related data. The scan data may relate to the image evaluation.

The printing evaluation system 300 comprises a plurality of electronic components, each of which is coupled to a data bus 702. The data bus 702 is operable for allowing each of the multiple, various electronic components of the printing evaluation system 300 to exchange data signals conductively with each of the other electronic components thereof.

The electronic components of the printing evaluation system 300 may comprise integrated circuit (IC) devices, including one or more microprocessors, including the image processor 333 (FIG. 3). The electronic components of the printing evaluation system 300 may also comprise other IC devices, such as a microcontroller, field-programmable gate array (FPGA) or other programmable logic device (PLD) or application-specific IC (ASIC).

The microprocessors may comprise a central processing unit (CPU) 704. The CPU 704 is operable for performing general data processing functions related to operations of the printing evaluation system 300. The electronic components of the printing evaluation system 300 may also comprise one or more other processors 744. The other microprocessors may also include a graphic processing unit (GPU) and/or digital signal processor (DSP) 704, which are each operable for performing data processing functions that may be somewhat more specialized than the general processing functions, as well as sometimes sharing some of the general processing functions with the CPU 704.

One of the processors 744 may also be operable as a "math" (mathematics) coprocessor. The math co-processor, DSP and/or GPU ("DSP/GPU") 744 are operable for performing computationally intense data processing. The computationally intense processing relates to imaging, image evaluation, graphics, dimension measurements, wireframe manipulations, coordinate system management, logistics, and other (e.g., mathematical, financial) information. The image processor 333 may comprise, or share operability or functionality with the CPU 704 and/or the GPU/DSP 744.

The data processing operations comprise computations performed electronically by the image processor 333, CPU 704, and the DSP/GPU 744. The microprocessors may comprise components operable as an ALU, a FPU, and associated memory cells. The memory cells comprise non-transitory data storage media, which may be configured as caches (e.g., "L1," "L2"), registers, latches and/or buffers.

For example, the processing core 43 of the image processor 433 comprises the ALU 431, FPU 432, L1 cache 433, and L2 cache. The memory cells are operable for storing data electronically in relation to various functions of the processor. A translational look-aside buffer (TLB) may be operable for optimizing efficiency of use of content-addressable memory (CAM) by the CPU 704, image processor 333, and/or the DSP/GPU 744.

The printing evaluation system 300 also comprises non-transitory computer readable storage media operable for storing data, e.g., electronically. For example, the image processor 333 is operable with reference pattern 305 and the scan image 331 to compute and evaluate the difference image 335, which may be stored with the non-transitory computer readable storage media 310.

The printing evaluation system 300 may also comprise a main memory 706, such as a random access memory (RAM) or other dynamic storage device 706 (or another non-transitory computer readable storage medium). The main memory 706 is coupled to data bus 702 for storing information and instructions, which are to be executed by the CPU 704. The main memory 706 also may be used for storing temporary variables or other intermediate information during execution of instructions by the CPU 704. Other memories (represented in the present description with reference to the RAM 706) may be installed for similar uses by the DSP/GPU 744.

The printing evaluation system 300 further comprises a read-only memory (ROM) 708 or other static storage device (or other non-transitory computer readable storage medium) coupled to the data bus 702. The ROM 708 is operable for storing static information and instructions for use by the CPU 704. In addition to the RAM 706 and the ROM 708, the non-transitory storage media of the printing evaluation system 300 may comprise at least one data storage device 710. The data storage device 710 is operable for storing information and instructions and allowing access thereto.

The data storage device 710 may comprise a magnetic disk drive, flash drive, or optical disk drive (or other non-transitory computer readable storage medium). The data storage device 710 comprises non-transitory media coupled to data bus 702, and may be operable for providing a "virtual memory" function. The virtual memory operations of the storage device 710 may supplement, at least temporarily, storage capacity of other non-transitory media, such as the RAM 706.

The non-transitory storage media of the printing evaluation system 300 also comprises stored instructions 783, which is stored (e.g., electronically, magnetically, optically, physically, etc.) in relation to software for programming, controlling, and/or configuring its operations relating to evaluating images and the operations of the printer 321 and the scanner 322. The non-transitory dimensioner instructions 755 may also (or alternatively) be stored in association with the storage 710 and other storage components of the printing evaluation system 300.

Non-transitory programming instructions, software, settings and configurations related to the evaluation of images are stored (e.g., magnetically, electronically, optically, physically, etc.) by a memory, flash, or drive related non-transitory storage medium 310 and/or with the non-transitory storage medium 710. The non-transitory storage medium 710 may also store a suite 783 of instructions, which relate to a suite of other functional features with which the printing evaluation system 300 may also be also operable, e.g., for performing other functional features.

An example embodiment may be implemented in which the suite 783 of features relates to applications, tools and tool sets, menus (and sub-menus) and macros associated with functions of printing evaluation system 300 related to capturing and evaluating images.

The printing evaluation system 300 comprises a user-interactive touchscreen 725, which is operable as a combined graphical user interface (GUI) and display component. The touchscreen 725 may comprise a liquid crystal display (LCD), which is operable for rendering images by modulating variable polarization states of an array of liquid crystal transistor components. The touchscreen 725 also comprises an interface operable for receiving haptic inputs from a user.

The haptic interface of the GUI touchscreen 725 may comprise, e.g., at least two arrays of microscopic (or transparent) conductors, each of which is insulated electrically from the other and disposed beneath a surface of the display 725 in a perpendicular orientation relative to the other. The haptic inputs comprise pressure applied to the surface of the touchscreen GUI 725, which cause corresponding local changes in electrical capacitance values proximate to the pressure application that are sensed by the conductor grids to effectuate a signal corresponding to the input.

In an example embodiment, the touchscreen GUI and display component 725 is operable for rendering the warnings (FIG. 5), graphical reports and presenting other information in relation to evaluating the computed difference image 335. The warnings 56 and related evaluation reports are rendered by the display 725 upon receipt of data related to the computation and evaluation of the difference image 335 by the image processor 333 and image evaluations from the CPU 704 and/or the GPU/DSP 744.

The touchscreen GUI component 725 may be implemented operably for rendering images over a heightened (e.g., high) dynamic range (HDR), the rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 725 may render an HDR image by coordinating the second modulation signal in real time, relative to the first modulation signal. Other display technologies may also (or alternatively) be used. For example, the display may comprise an organic LED (OLED).

A plurality of inputs 714 may comprise one or more electromechanical switches, which may be implemented as buttons, escutcheons, or cursor controls. The inputs 714 may also comprise a keyboard. The keyboard may comprise an array of alphanumeric (and/or ideographic, syllabary based) keys operable for typing letters, number, and other symbols. The keyboard may also comprise an array of directional (e.g., "up/down," "left/right") keys, operable for communicating commands and data selections to the CPU 704 and for controlling movement of a cursor rendering over the touchscreen GUI display 725.

The directional keys may be operable for presenting two (2) degrees of freedom of a cursor, over at least two (2) perpendicularly disposed axes presented on the display component of the touchscreen GUI 725. A first 'x' axis is disposed horizontally. A second 'y' axis, complimentary to the first axis, is disposed vertically. Thus, the printing evaluation system 300 is thus operable for specifying positions over a representation of a geometric plane and/or other coordinate systems.

Execution of instruction sequences contained in the image storage media 310 and main memory 706 cause the image processor and CPU 704 to perform process steps (e.g., processes 10, 140; FIG. 1, 2) associated with operations of the printing evaluation system 300. One or more of the microprocessors is operable for executing instructions contained in the image storage 310 and/or the main memory 706. Additionally and/or alternatively, hard-wired circuitry may be used in place of, or in combination with the software instructions. Thus, the printing evaluation system 300 is not limited to any specific combination of circuitry, hardware, firmware, and/or software.

The term "computer readable storage medium," as used herein, may refer to any non-transitory storage medium that participates in providing instructions to the image processor 333, CPU 704 (and the DSP/GPU 744) for execution. Such a medium may take many forms, including but not limited to, non-volatile media, volatile media, and transmission media. Non-volatile media comprises, for example, configured/programmed active elements of the image processor 333, the CPU 704, the DSP/GPU 744, the non-transitory image related media 310, stored print evaluation instructions 783 and other optical, electronic, or magnetic disks, such as storage device 710. Volatile media comprises dynamic memory associated, e.g., with the RAM 706.

Transmission media comprises coaxial cables, copper wire and other electrical conductors and fiber optics, including the wires (and/or other conductors or optics) that comprise the data bus 702.

Transmission media can also take the form of electromagnetic radiation (e.g., light waves), such as may be generated at radio frequencies (RF) and infrared (IR) and other optical frequencies. Data communications may also be effectuated using other means, including acoustic (e.g., sound related) or other mechanical, vibrational, or phonon related media.

Non-transitory computer-readable storage media may comprise, for example, flash drives such as may be accessible via universal serial bus (USB) or any medium from which a computer can read data.

Various forms of non-transitory computer readable storage media may be involved in carrying one or more sequences of one or more instructions to CPU 704 for execution. For example, the instructions may initially be carried on a magnetic or other disk of a remote computer (e.g., computer 798). The remote computer can load the instructions into its dynamic memory and send the instructions over networks 788.

The printing evaluation system 300 can receive the data over the network 788 and use an IR, RF or other transmitter means to convert the data to corresponding signals. An IR, RF or other signal detector or receiver ("receiver") coupled to the data bus 702 can receive the data carried in the corresponding signals and place the data on data bus 702. The operations associated with the transmitter and the receiver may be combined in a transmitter/receiver (transceiver) means. The transmitter, receiver, and/or transceiver means may be associated with the interfaces 718.

The data bus 702 carries the data to main memory 706, from which CPU 704 and the DSP/GPU 744 retrieve and execute the instructions. The instructions received by main memory 706 may optionally be stored on storage device 710 either before or after execution by CPU 704.

The interfaces 718 may comprise a communication interface coupled to the data bus 702. The communication interface is operable for providing a two-way (or more) data communication coupling to a network link 720, which may connect wirelessly at radio frequencies (RF) to the network 788. Wireless communication may also be implemented optically, e.g., at IR frequencies.

Signals may be exchanged via the interfaces 718 with an external device 799 (e.g., another computer or external storage device) through a compatible communication port 719.

In any implementation, the communication interface 718 sends and receives electrical, electromagnetic, or optical signals that carry digital data streams representing various types of information. The network link 720 provides data communication through the network 788 to other data devices.

The network 788 may use one or more of electrical, electromagnetic, and/or optical signals carrying digital data streams. The signals sent over the network 788 and through the network link 720 and communication interface 718 carry the digital data to and from the printing evaluation system 300. The printing evaluation system 300 can send messages and receive data, including program code, through the network 788, network link 720, and communication interface 718.

\* \* \*

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;

U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;

U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

* * *

Example embodiments of the present invention are thus described in relation to methods and systems (and not unrelated non-transitory computer readable storage media and media products) for evaluating an output pattern printed on a medium. In an example embodiment, a reference pattern is stored. The output pattern is printed on the medium based correspondingly on the stored reference pattern. A scan instance of the output pattern is rendered, which comprises a set of features at least corresponding to the printed output pattern and zero or more features additional thereto. A difference image, having the zero or more features of the rendered scan instance, is computed based on a comparison of the rendered scan instance to the stored reference pattern. Upon the zero or more features comprising at least one feature, the computed difference image is evaluated in relation to a proximity of at least one feature to locations pixels of the reference pattern.

Example embodiments of the present invention thus evaluate printed media products of mission-critical printing processes to verify or confirm that information presented by output images correspond accurately to original instances and/or input digital reference patterns, on which the printing is based. Example embodiments of the present invention thus verify the printed media products without implicating, or resorting to OCR based confirmation of text related images or for printed data patterns, to grading related to standards, specifications, yet exceeding the confirmation of simply checking scannability of the media products. Further, example embodiments verify the printed media products automatically with a high degree of accuracy and testing throughput speed, which obviate spot checking sampled portions of a total printing product output, yet add no significant latency or demand on an operator's attention and focus.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are unnecessary for describing example embodiments of the invention, and not particularly relevant to understanding of significant features, functions and aspects of the example embodiments described herein.

In an exemplary embodiment, the present invention embraces a media product comprising an output pattern evaluated by a process comprising: storing a reference pattern, wherein the output pattern is printed on the medium correspondingly based on the stored reference pattern; rendering a scan based instance of the output pattern, wherein the rendered scan based instance comprises: a set of features at least corresponding to the printed output pattern; and zero or more features in addition to the set of at least corresponding to the printed output pattern; computing a difference image based on a comparison of the rendered scan based instance to the stored reference pattern, the computed difference image comprising the zero or more features of the rendered scan based instance; evaluating the computed difference image upon the zero or more features comprising at least one feature in relation to a proximity of at least one feature to a location of one or more picture elements (pixels) of the stored reference pattern; determining, based on the evaluation of the computed difference image, that the proximity comprises an unacceptably small separation between a position of one or more pixels of the at least one of the zero or more features to the location of the one or more stored reference pattern pixels; and presenting a warning associated with the output pattern, the warning based on the determination in relation to the unacceptably small separation.

In the specification and/or figures, typical embodiments of the invention have been disclosed. The present invention is not limited to such example embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed, is:

1. An evaluation method, comprising:
   receiving a reference pattern corresponding to an output pattern over a network, wherein the output pattern is printed on a medium based on the received reference pattern;
   rendering a scan based instance of the output pattern, wherein the rendered scan based instance comprises:
   a set of features at least corresponding to the printed output pattern; and
   zero or more defect features in addition to the set of features at least corresponding to the printed output pattern, the zero or more defect features comprising zero or more printed defect features;
   computing a difference image based on a comparison of the rendered scan based instance to the received reference pattern, the computed difference image comprising the zero or more defect features of the rendered scan based instance; and
   evaluating the computed difference image upon the zero or more defect features comprising at least one defect feature in relation to a proximity of at least one feature to a location of one or more picture elements of the received reference pattern.

2. The evaluation method of claim 1, comprising:
   determining, based on the evaluation step, that the proximity comprises an unacceptably small separation between a position of one or more pixels of the at least one of the zero or more defect features to the location of the one or more received reference pattern pixels; and
   presenting a warning, based on the determining step, in relation to the unacceptably small separation.

3. The evaluation method of claim 2, wherein the unacceptably small separation relates to a spatial distance between one or more pixels of the at least one of the zero or more defect features and a position of at least one of the one or more pixels of the received reference pattern.

4. The evaluation method of claim 2, comprising the step of adjusting a subsequent printing of the output pattern based on the determining step, wherein the at least one of the zero or more defect features is eliminated from an output pattern of the subsequent printing.

5. The evaluation method of claim 1, comprising the step of determining that the proximity of the at least one of the zero or more defect features is acceptable in relation to the position of each of a plurality of pixels of the received reference pattern.

6. The evaluation method of claim 5, wherein the determining that the proximity is acceptable relates to an acceptably large separation between each pixel of the at least one of the zero or more defect features to the location of each of the one or more received reference pattern pixels.

7. The evaluation method of claim 5, comprising, upon the determining that the proximity is acceptable in relation to the position of the received reference pattern, the steps of indicating that the at least one of the zero or more defect features is acceptable.

8. The evaluation method of claim 1, wherein the step of rendering the scan based instance comprises the step of scanning the output pattern printed on the medium, the scan based instance rendered based on the scanning step.

9. The evaluation method of claim 1, comprising generating a print quality report comprising whether the printed output pattern complies with a specification, a manner in which the printed output pattern differs from the received reference pattern, steps to correct deviations, statistics related to acceptable and unacceptable defects, and/or a total number of defects.

10. A system, comprising:
    a scanner operable for receiving a reference pattern corresponding to an output pattern over a network and rendering a scan based instance of the output pattern, wherein the rendered scan based instance comprises:
    a set of features at least corresponding to the printed output pattern; and
    zero or more defect features in addition to the set of features at least corresponding to the printed output pattern, the zero or more defect features comprising zero or more printed defect features; and
    one or more image processors operable for:
    computing a difference image based on a comparison of the rendered scan based instance to the received reference pattern, the computed difference image comprising the zero or more defect features of the rendered scan based instance; and
    evaluating the computed difference image upon the zero or more defect features comprising at least one defect feature in relation to a proximity of at least one defect feature to a location of one or more picture elements of the received reference pattern.

11. The system of claim 10, wherein the computation of the difference image by the one or more image processors comprises performing an 'exclusive OR' (XOR) logical operation over the pixels of the rendered scan based instance of the output pattern, relative to each corresponding pixel of the received reference pattern.

12. The system of claim 10, wherein the evaluation of the computed difference image by the one or more image processors comprises:
    determining, based on the evaluation of the computed difference image, that the proximity comprises an unacceptably small separation between a position of one or more pixels of the at least one of the zero or more defect features to the location of the one or more received reference pattern pixels; and
    presenting a warning, based on the determining step, in relation to the unacceptably small separation.

13. The system of claim 12, wherein the unacceptably small separation relates to a spatial distance between the one or more pixels of the at least one of the zero or more defect features and a position of at least one of the one or more pixels of the received reference pattern.

14. The system of claim 10, comprising a printer component operable for printing the output pattern on the medium based on the received reference pattern.

15. The system of claim 14, wherein the printer component is further operable for adjusting a subsequent printing of the output pattern based on the determining step, wherein the at least one of the zero or more defect features is eliminated from an output pattern of the subsequent printing.

16. The system of claim 14, wherein the received reference pattern comprises a graphic model, wherein the printer component is further operable for printing the output pattern wherein the printed output pattern corresponds to the received reference pattern based on the graphic model.

17. The system of claim 10, comprising a scanner component operable for scanning the output pattern printed on the medium and for the rendering of the scan based instance.

18. The system of claim 10, wherein the system generates a print quality report comprising whether the printed output pattern complies with a specification, a manner in which the printed output pattern differs from the received reference pattern, steps to correct deviations, statistics related to acceptable and unacceptable defects, and/or a total number of defects.

19. A method, comprising:
- receiving a reference pattern corresponding to an output pattern printed on a medium;
- scanning the printed output pattern to determine (i) a set of features of the printed output pattern and (ii) zero or more printed defect features of the printed output pattern;
- computing a difference image by comparing the scanned, printed output pattern to the received reference pattern, the computed difference image comprising the zero or more printed defect features; and
- evaluating the computed difference image if the zero or more printed defect features comprise at least one printed defect feature in proximity to at least one feature of one or more picture elements of the received reference pattern.

20. The method of claim 19, comprising generating a print quality report comprising whether the printed output pattern complies with a specification, a manner in which the printed output pattern differs from the received reference pattern, steps to correct deviations, statistics related to acceptable and unacceptable defects, and/or a total number of defects.

* * * * *